US008387354B2

(12) United States Patent
Chillar et al.

(10) Patent No.: US 8,387,354 B2
(45) Date of Patent: Mar. 5, 2013

(54) OIL VARNISH MITIGATION SYSTEMS

(75) Inventors: Rahul J. Chillar, Atlanta, GA (US); Julio Enrique Mestroni, Atlanta, GA (US); Erwing Calleros, Atlanta, GA (US); Prasad Gokhale, Greenville, SC (US)

(73) Assignee: General Electric Company, Schenectady, NY (US)

( * ) Notice: Subject to any disclaimer, the term of this patent is extended or adjusted under 35 U.S.C. 154(b) by 79 days.

(21) Appl. No.: 12/881,239

(22) Filed: Sep. 14, 2010

(65) Prior Publication Data

US 2012/0060463 A1 Mar. 15, 2012

(51) Int. Cl.
*F02C 7/06* (2006.01)

(52) U.S. Cl. ...................................................... 60/39.08

(58) Field of Classification Search ................. 60/39.08; 184/6.11

See application file for complete search history.

(56) References Cited

U.S. PATENT DOCUMENTS

| | | | | |
|---|---|---|---|---|
| 4,452,037 | A | 6/1984 | Waddington et al. | |
| 5,159,808 | A * | 11/1992 | Kast | 60/39.091 |
| 6,241,482 | B1 * | 6/2001 | Iga | 417/222.1 |
| 6,286,299 | B1 * | 9/2001 | Junquera | 60/39.08 |
| 2008/0121376 | A1 * | 5/2008 | Schwarz et al. | 165/104.28 |
| 2009/0235631 | A1 * | 9/2009 | Bocquet et al. | 60/39.08 |
| 2010/0107648 | A1 * | 5/2010 | Bulin et al. | 60/778 |

OTHER PUBLICATIONS

European Search Report for Application No. 11181157.6-2321 dated Feb. 7, 2012.

* cited by examiner

*Primary Examiner* — Phutthiwat Wongwian

(74) *Attorney, Agent, or Firm* — Sutherland Asbill & Brennan LLP

(57) ABSTRACT

A lubricating oil varnish mitigation system for a turbine engine. The lubricating oil varnish mitigation system may include a lubricating oil circuit with a lubricating oil therein and a hydraulic oil circuit separate from the lubricating oil circuit with a hydraulic oil therein.

20 Claims, 6 Drawing Sheets

OIL VARNISH MITIGATION SYSTEMS

TECHNICAL FIELD

The present application relates generally to gas turbine engines and more particularly relates to systems for the mitigation of lubricating oil varnish and the damage to engine components that may be caused thereby.

BACKGROUND OF THE INVENTION

A significant issue in the maintenance and upkeep of known gas turbine engines is the creation of lubricating oil varnish. For example, lubricating oil in a hydraulic circuit may be in communication with a number of servos that operate inlet guide vanes, gas control valves, liquid fuel valves, etc. Varnish deposits on the oil wetted components and elsewhere may lead to the failure and/or the malfunction of these servos and other components. Such failures and malfunctions may result in the tripping of the gas turbine engine and a subsequent revenue loss caused by the downtime for required repairs.

Oil varnishing may be the result of a complex string of events. Specifically, the molecules in the oil stream may be broken via chemical, mechanical, and/or thermal processes. For example, chemical processes may include oxidation of the oil. Oxidation may be accelerated by heat and/or the presence of metal particulates therein. Mechanical processes may include "shearing," where the oil molecules may be torn apart as they pass between moving mechanical surfaces. Thermal processes may include pressure-induced dieseling or pressure-induced thermal degradation due to the high pressures and temperatures. Electrostatic charges also may cause localized thermal-oxidative oil degradation. Turbines that are operated in a peaking or a cycling mode may be more susceptible to oil varnishing due to the effects of thermal cycling. Other processes and combinations thereof also may be present although not fully understood to date.

There is thus a desire for oil varnish mitigation systems so as to limit both the creation of oil varnish and the damage caused thereby, particularly in a hydraulic circuit with the servos therein and other components that may be susceptible to varnish damage and the like. Reducing varnish damage should improve overall system efficiency and reduce required maintenance and downtime. Such varnish mitigation systems may be retrofitted into existing gas turbine engines or may be original equipment in new systems.

SUMMARY OF THE INVENTION

The present application thus provides a lubricating oil varnish mitigation system for a turbine engine. The lubricating oil varnish mitigation system may include a lubricating oil circuit with a lubricating oil therein and a hydraulic oil circuit separate from the lubricating oil circuit with a hydraulic oil therein.

The present application further provides a lubricating oil varnish mitigation system for a turbine engine. The lubricating oil varnish mitigation system may include a lubricating oil circuit with a number of pumps and a lift oil supply and a hydraulic oil circuit separate from the lubricating oil circuit with a number of hydraulic oil pumps.

These and other features and improvements of the present application will become apparent to one of ordinary skill in the art upon review of the following detailed description when taken in conjunction with the several drawings and the appended claims.

DETAILED DESCRIPTION

Figure 1:
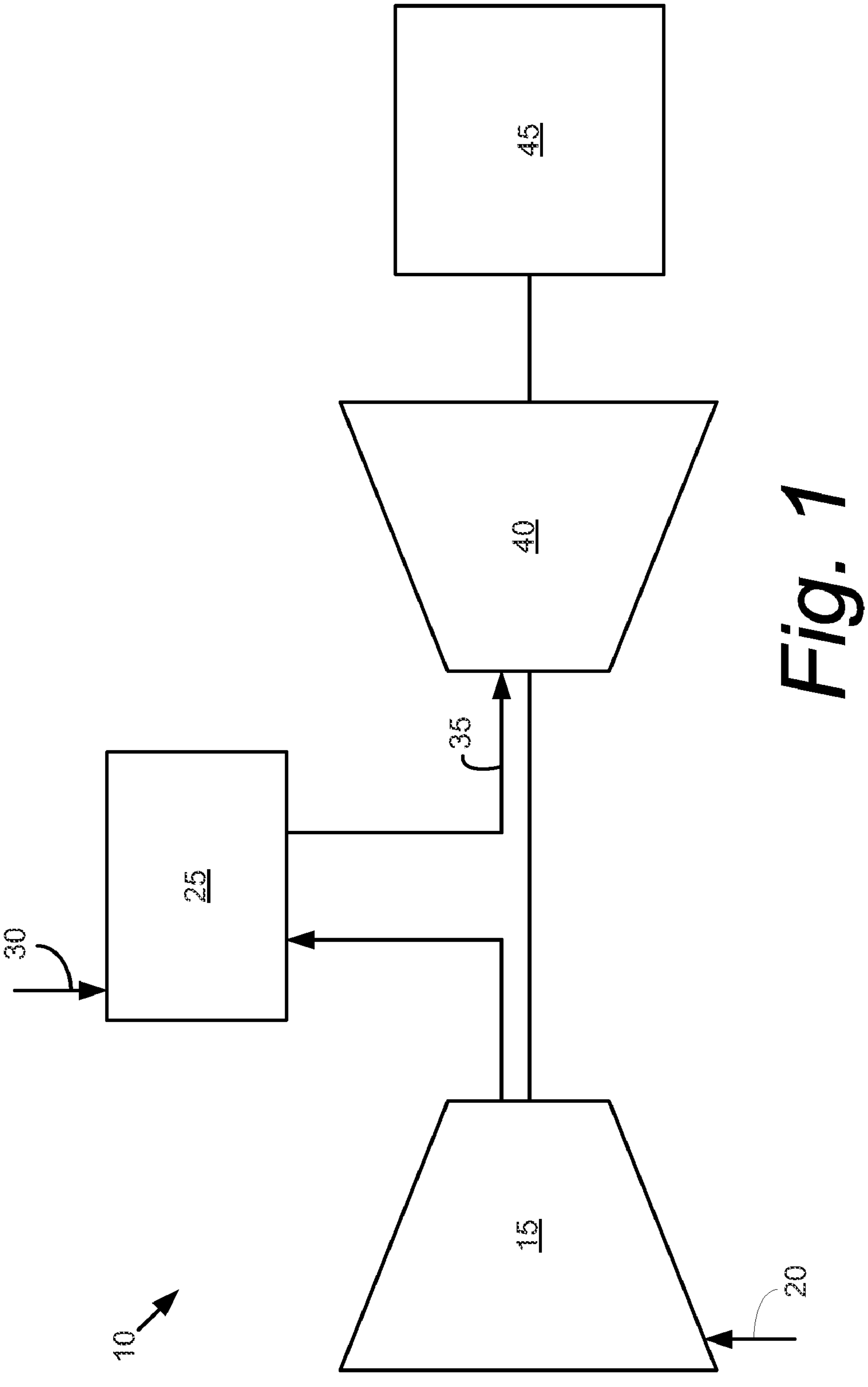
Fig. 1 (PRIOR ART)
FIG. 1 is a schematic view of a known gas turbine engine.

Referring now to the drawings, in which like numerals refer to like elements throughout the several views, FIG. 1 shows a schematic view of a known gas turbine engine 10. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a compressed flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 and an external load 45 such as an electrical generator and the like.

The gas turbine engine 10 may use natural gas, various types of syngas, and/or other types of fuels. The gas turbine engine 10 may be one of any number of different gas turbine engines offered by General Electric Company of Schenectady, N.Y. such as the F-Class gas turbine engines. The gas turbine engine 10 may have other configurations and may use other types of components. Other types of gas turbine engines also may be used herein. Multiple gas turbine engines 10, other types of turbines, and other types of power generation equipment also may be used herein together.

Figure 2:
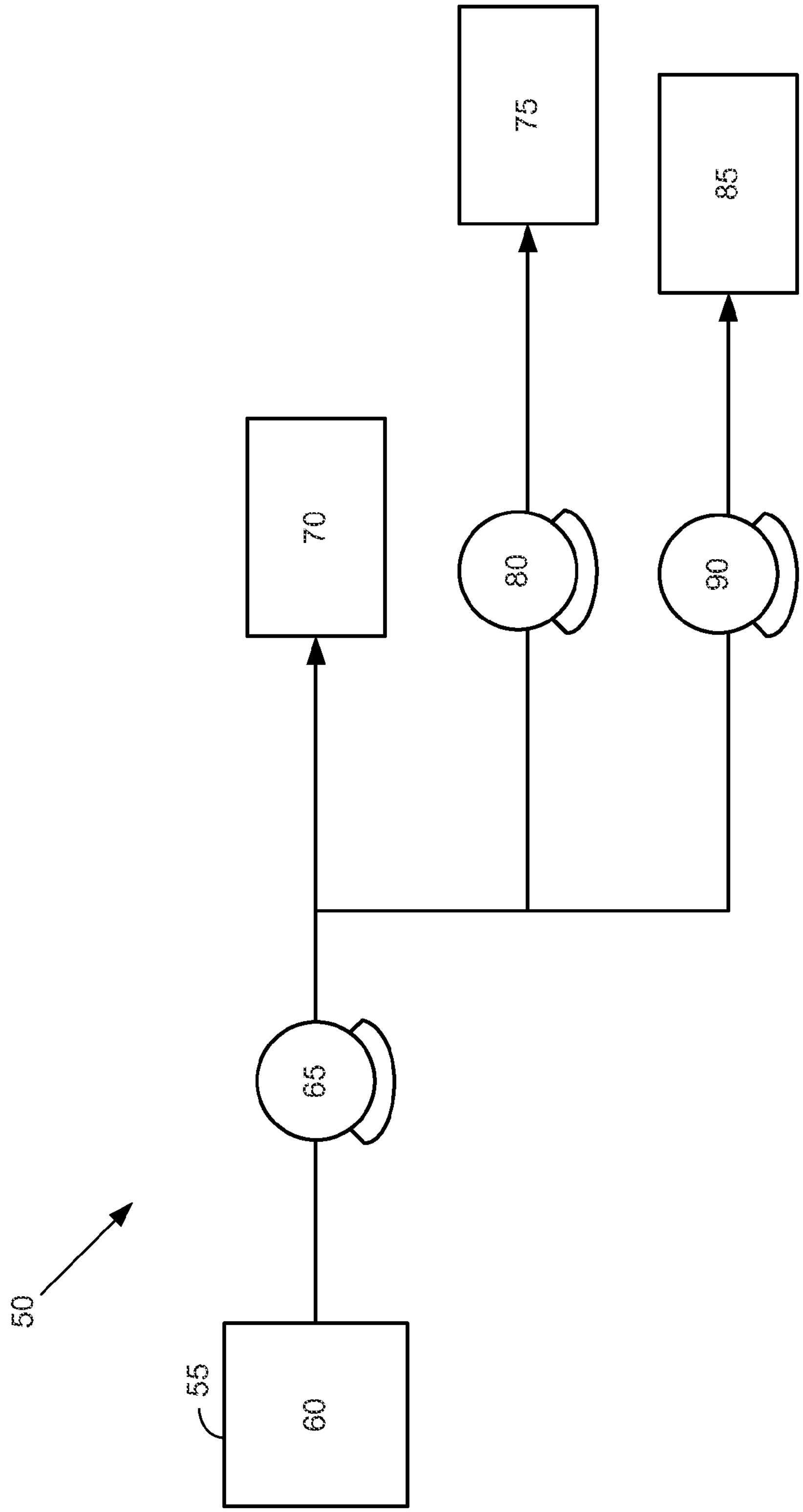
Fig. 2 (PRIOR ART)
FIG. 2 is a schematic view of a known lubricating oil system.

FIG. 2 shows a high level view of a known lubricating oil system 50 for use in a gas turbine engine 10 and the like. The lubricating oil system 50 may have been used in an F-class gas turbine engine offered by General Electric Company of Schenectady, N.Y. and similar types of gas turbine engines 10. The lubricating oil system 50 includes a lubricating oil tank 55 with a volume of a lubricating oil 60 therein. The lubricating oil tank 55 may be in communication with a lubricating pump 65. The lubrication pump 65 may be in communication with a lubricating oil supply 70, a hydraulic oil supply 75 via a hydraulic oil pump 80, a lift oil supply 85 via a lift oil pump 90, and the like. Other configurations and other types of components also may be used herein.

As is shown, the lubricating oil tank 55 serves both the hydraulic oil supply 75 and the lift oil supply 85. The lubricating oil 60 thus will flow through the components of the turbine 40 and through other system components where it may be subject to high pressures, stresses, temperatures, wear and tear, and the like. The lubricating oil 60 further may flow through numerous filters that may cause static changes and increases in temperature that also may result in oil breakdown and varnish accumulation.

Figure 3:
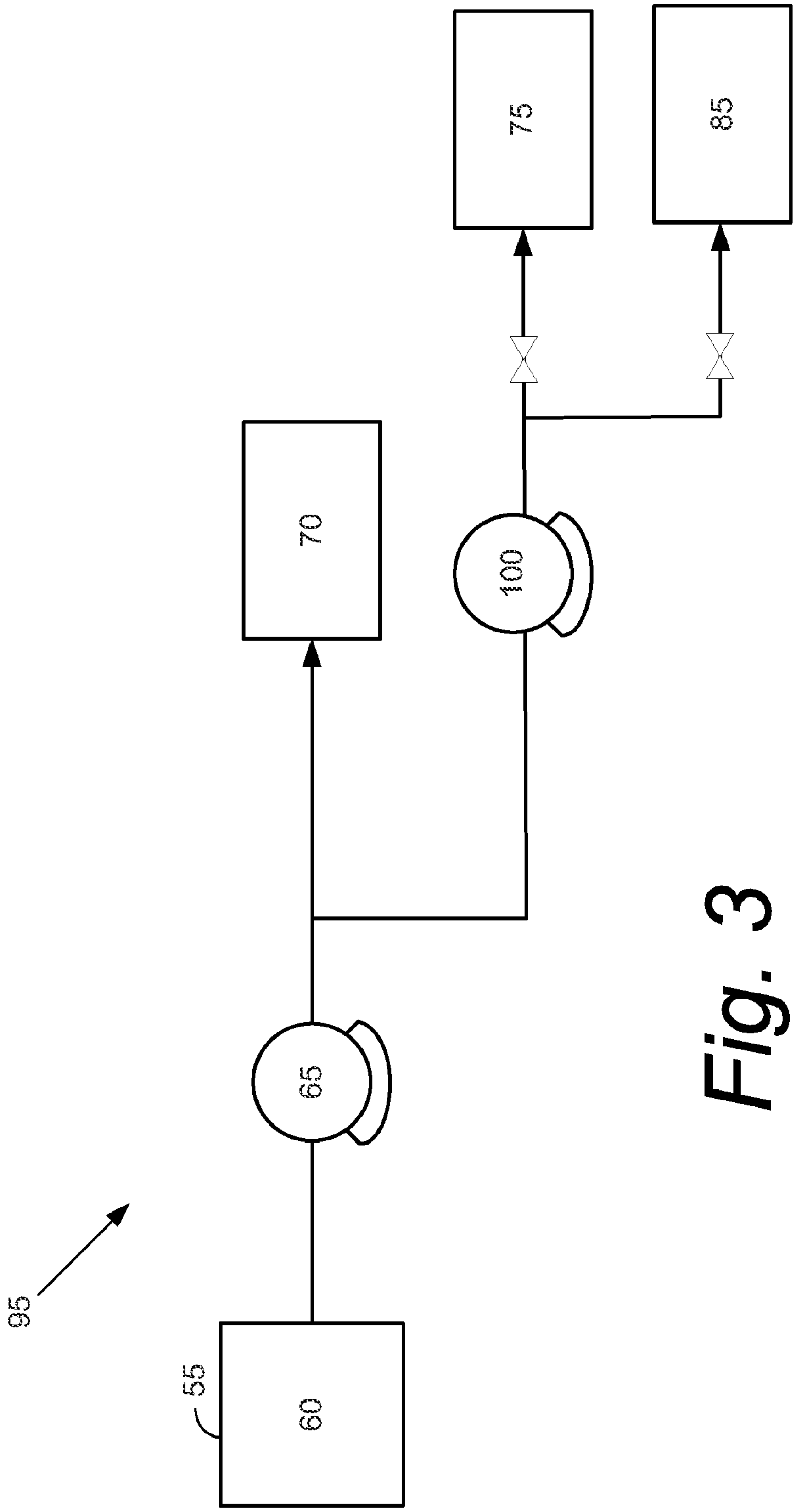
Fig. 3 (PRIOR ART)
FIG. 3 is an alternative embodiment of a known lubricating oil system.

FIG. 3 shows an alternative embodiment of a known lubricating oil system 95. This lubricating oil system 95 also includes the lubricating oil tank 55 with the lubricating oil 60 therein. The lubricating oil tank 55 is in communication with the lubricating oil pump 65. The lubricating oil pump 65 is again in communication with the lubricating oil supply 70, the hydraulic oil supply 75, the lift oil supply 85, and the like. In this embodiment, however, a single hydraulic oil pump/lift oil pump 100 may be used. The combined hydraulic/lift oil pump 100 may have the capability to work at two different settings so as to adjust the supply pressure depending upon which system may be in use. In other words, the hydraulic oil supply 75 and the lift oil supply 85 may operate at different pressures. Other configurations and other types of components also may be used herein.

Figure 4:
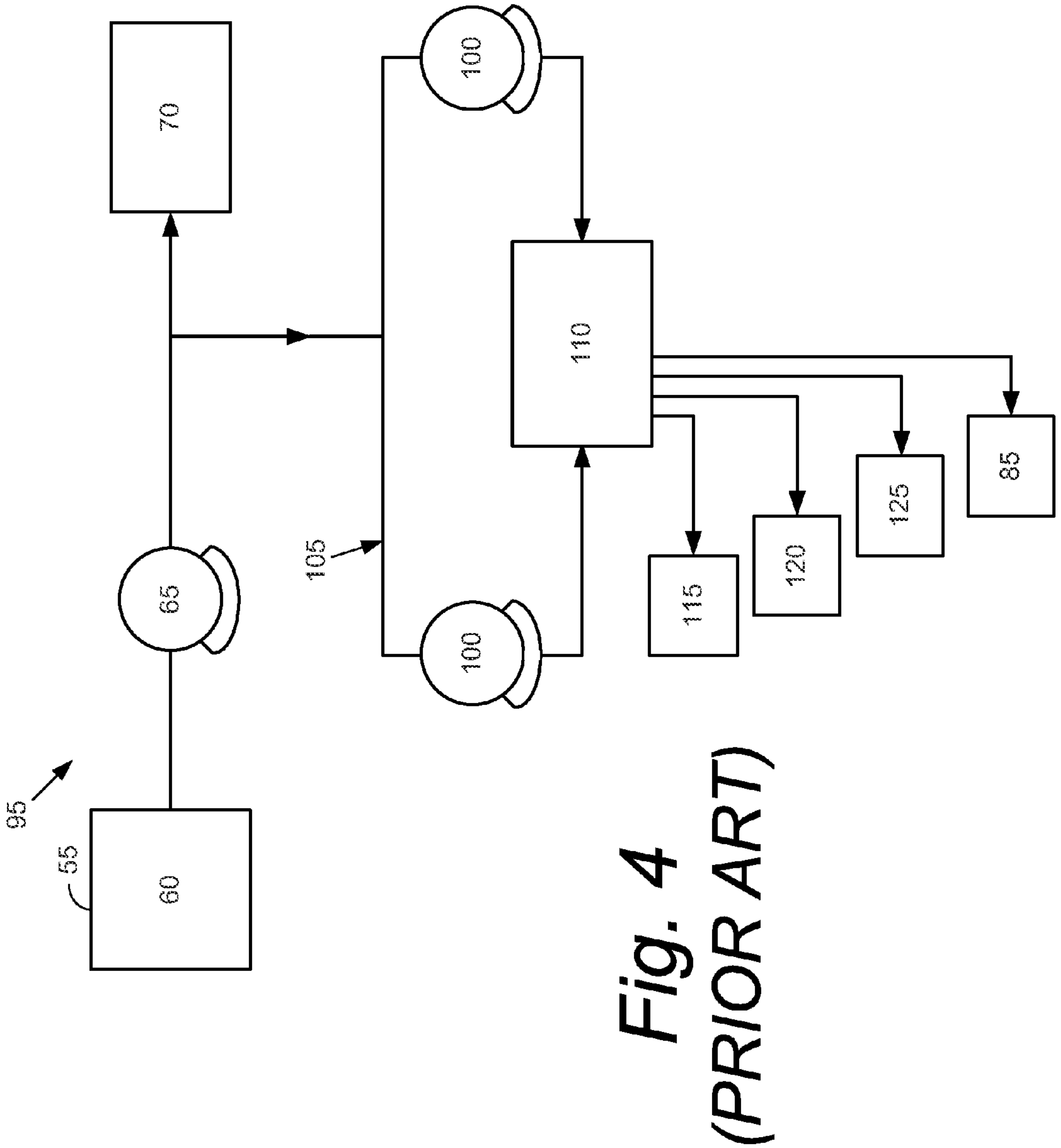
Fig. 4 (PRIOR ART)
FIG. 4 is a schematic view of the lubricating oil system of FIG. 3 in the context of a hydraulic/lift oil system.

FIG. 4 shows the use of the lubricating oil system 95 in the context of an expanded hydraulic circuit 105 and the lift oil supply 85. The lubricating oil system 95 and similar systems may be currently in use. In this example, the hydraulic system 105 may include a hydraulic manifold or unit 110. The hydraulic unit 110 may be in communication with one or more of the hydraulic/lift pumps 100. As described above, the hydraulic/lift pumps 100 may have multiple setting depending upon the desired pressure and the desired circuit in use. In this example, redundant hydraulic/lift pumps 100 are shown.

The hydraulic unit 110 may be in communication with a hydraulic supply to fuel gas system 115, a hydraulic supply to the inlet guide vane system 120, a hydraulic supply to liquid fuel system 125, and other components. The hydraulic unit 110 also may be in communication with the lift oil supply 85. One or more of these supplies may include the servos and other types of internal components that may be subject to varnish damages as is described above. Other configurations and other types of components also may be used herein.

Figure 5:
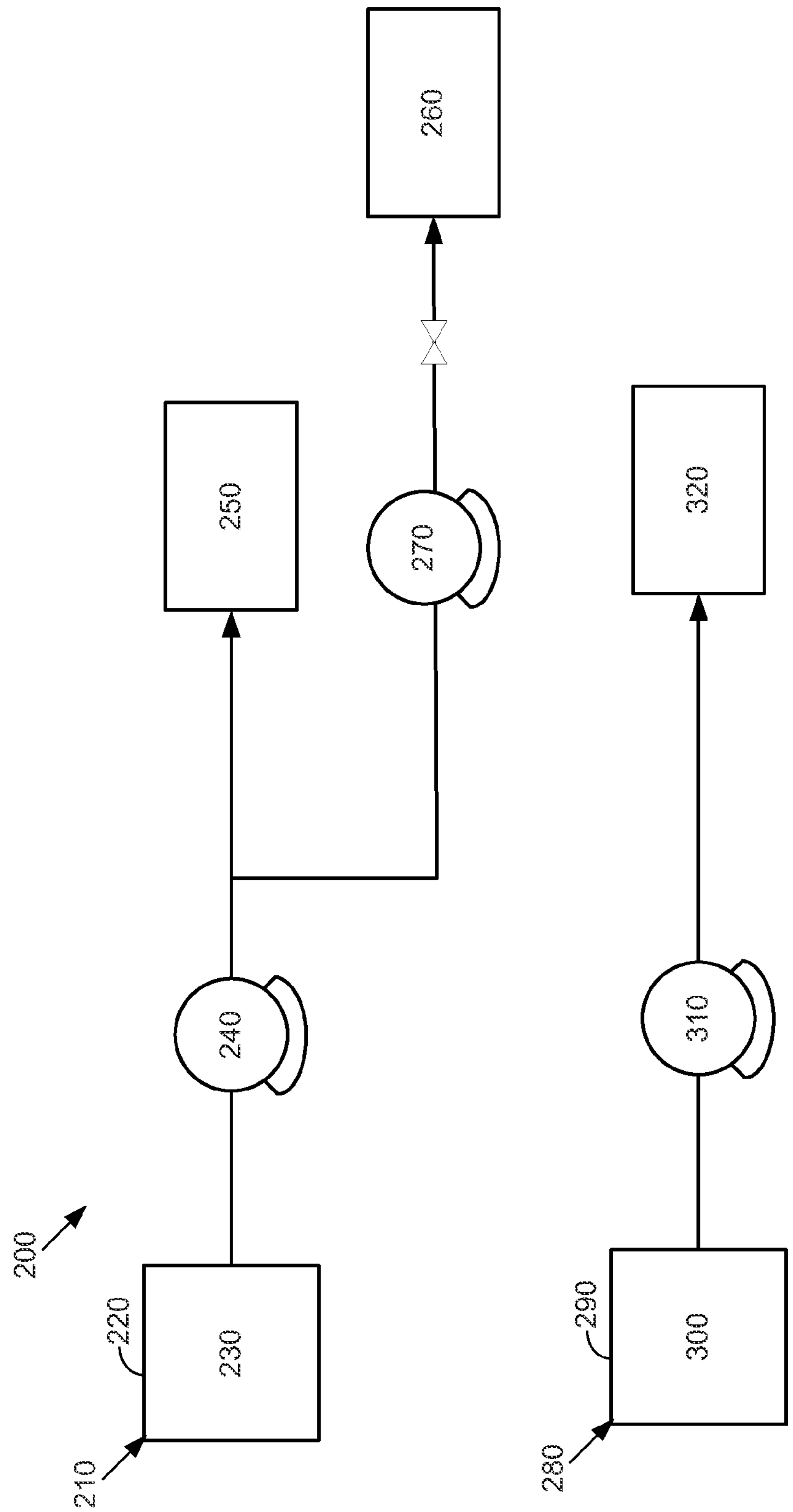
FIG. 5 is a schematic view of a lubricating oil varnish mitigation system as may be described herein.

FIG. 5 shows an example of a lubricating oil varnish mitigation system 200 as may be described herein. Similar to the configuration described above, the lubricating oil varnish mitigation system 200 may include a lubricating oil circuit 210. The lubricating oil circuit 210 may include a lubricating oil tank 220 with a volume of a lubricating oil 230 therein. The lubricating oil tank 220 may be in communication with a lubricating oil pump 240. The lubricating oil pump 240 may be in communication with a lubricating oil supply 250, a lift oil supply 260 via a lift oil pump 270, and the like. The lubricating oil circuit 210 may function in a manner similar to the lubricating oil systems 50 described above. Other configurations and other types of components also may be used herein.

The lubricating oil varnish mitigation system 200 also may include a hydraulic circuit 280. The hydraulic circuit 280 may include a hydraulic oil tank 290 with a volume of a hydraulic oil 300 therein. The hydraulic oil 300 may be a specialized oil such as a Group II base oil and the like. Other types of hydraulic oil 300 may be used herein. The hydraulic oil tank 290 may be in communication with a hydraulic oil pump 310. The hydraulic oil pump 310 may be in communication with a hydraulic oil supply 320 and the like. Other configurations and other types of components also may be used herein.

By separating the lubricating oil circuit 210 and the hydraulic oil circuit 280, the hydraulic oil 300 may not be subject to the high pressures, temperatures, and stresses commonly found with the lubricating oil 230. As such, the hydraulic oil 300 may not varnish and, hence, not cause varnish damage to the components within the hydraulic circuit 280 such as the servos and the like. Moreover, the hydraulic oil 300 may have a significantly longer lifetime as compared to the lubricating oil 230 as currently in use.

As compared to the lubricating oil system 95 described above, the additional hydraulic oil pump 210 may be required in the hydraulic circuit 280. This hydraulic oil pump 310, however, may be simplified in that only one pressure setting may be required as opposed to the two settings required with the hydraulic/lift pump 100. Likewise, the additional hydraulic oil tank 290 also may be required to hold the separate volume of the hydraulic oil 300. The existing lubricating oil tank 220, however, may now be smaller in size.

Figure 6:
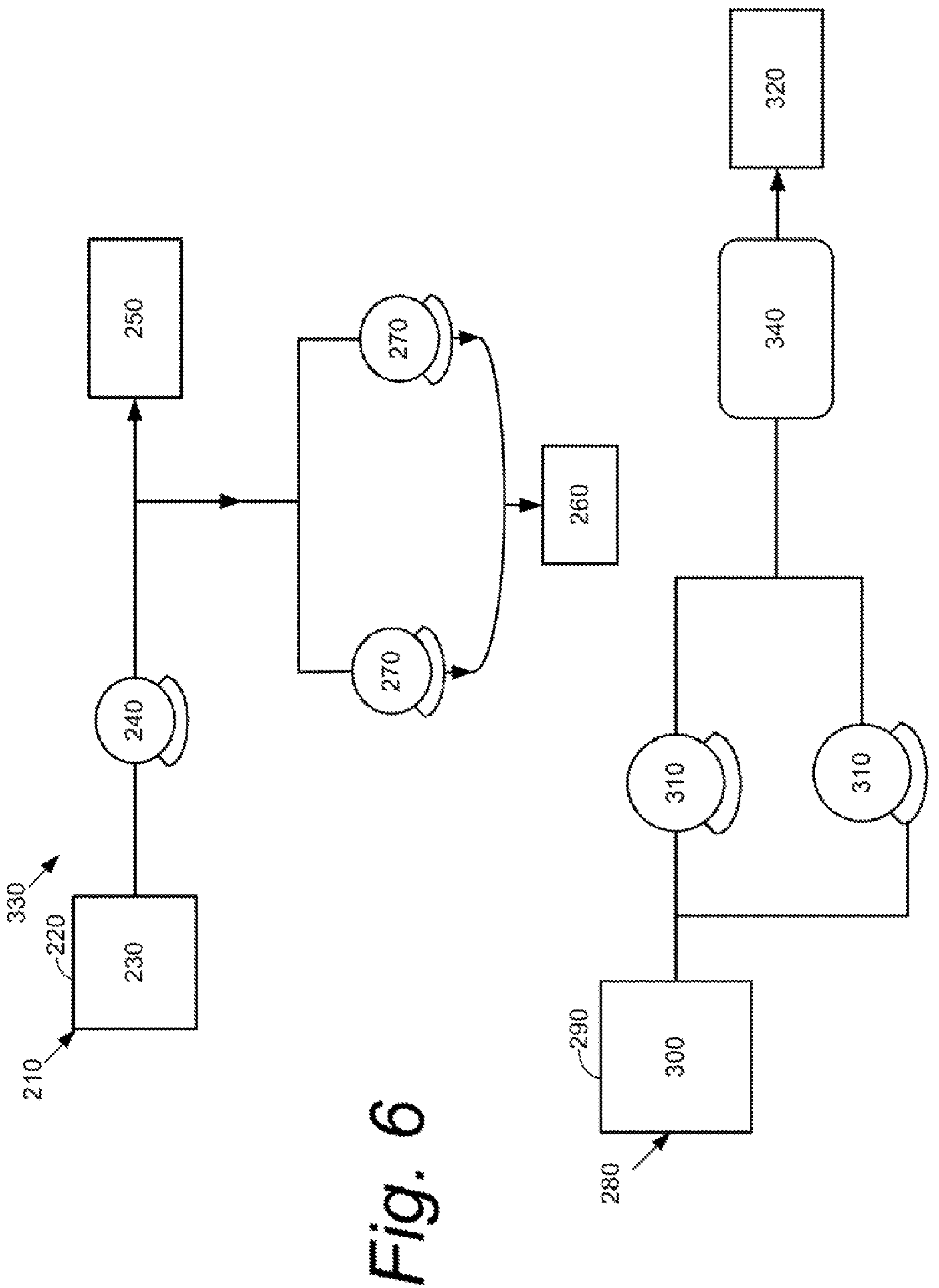
FIG. 6 is a schematic view of an alternative embodiment of the lubricating oil varnish mitigation system as may be described herein.

FIG. 6 shows an alternative embodiment of a lubricating oil varnish mitigation system 330. In this example, the lubricating oil varnish mitigation system 330 also may include a similar lubricating oil circuit 210 and a similar hydraulic oil circuit 280 to those described above. The lubricating oil circuit 210 may include a number of redundant lift oil pumps 270. Likewise, the hydraulic oil circuit 280 also may include a number of redundant hydraulic oil pumps 310. Both the lubricating oil circuit 210 and the hydraulic oil circuit 280 within the lubricating oil varnish mitigation system 330 thus includes the redundant pumps as is shown in lubricating oil system 95 described above. Such redundancy is not required such that the single pumps 240, 310 described above also may be used. Other configurations and other types of components also may be used herein.

The hydraulic circuit 280 also may include a hydraulic manifold 340 in communication with the hydraulic oil supply 320. The hydraulic oil supply 320 or the hydraulic manifold 340 may be in communication with the hydraulic supply to fuel gas system 115, the hydraulic supply to inlet guide vane system 120, the hydraulic supply to liquid fuel system 125, and other components herein.

The lubricating oil varnish mitigation systems 100 described herein thus improves overall gas turbine reliability while reducing required maintenance, downtime, and potential revenue loss. The use of the separate hydraulic circuit 280 with the hydraulic oil 300 therein largely eliminates issues related to oil varnishing in the components of this circuit and the like. The lubricating oil varnish mitigation system 100 may be retrofit or original equipment.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A lubricating oil varnish mitigation system for a turbine engine, comprising:

a lubricating oil circuit;

the lubricating oil circuit comprising a lubricating oil therein and a lubricating oil tank;

the lubricating oil in fluid communication with components of the turbine engine; and a hydraulic oil circuit separate from the lubricating oil circuit;

the hydraulic oil circuit comprising a hydraulic oil therein and a hydraulic oil tank;

the hydraulic oil in fluid communication with one or more servos that operate fuel valves of the turbine engine.

2. The lubricating oil varnish mitigation system of claim 1, wherein an operating pressure of the hydraulic oil is less than an operating pressure of the lubricating oil.

3. The lubricating oil varnish mitigation system of claim 1, wherein the lubricating oil circuit comprises a lubricating oil pump.

4. The lubricating oil varnish mitigation system of claim 1, wherein the lubricating oil circuit comprises a lift oil pump.

5. The lubricating oil varnish mitigation system of claim 1, wherein the lubricating oil circuit comprises a plurality of lift oil pumps.

6. The lubricating oil varnish mitigation system of claim 1, wherein the lubricating oil circuit comprises a lubricating oil supply.

7. The lubricating oil varnish mitigation system of claim 1, wherein the lubricating oil circuit comprises a lift oil supply.

8. The lubricating oil varnish mitigation system of claim 1, wherein an operating temperature of the hydraulic oil is less than an operating temperature of the lubricating oil.

9. The lubricating oil varnish mitigation system of claim 1, wherein the hydraulic oil circuit comprises a hydraulic oil pump.

10. The lubricating oil varnish mitigation system of claim 1, wherein the hydraulic oil circuit comprises a plurality of hydraulic oil pumps.

11. The lubricating oil varnish mitigation system of claim 1, wherein the hydraulic oil circuit comprises a hydraulic oil supply.

12. The lubricating, oil varnish mitigation system of claim 1, wherein the hydraulic oil circuit comprises a hydraulic oil manifold.

13. The lubricating oil varnish mitigation system of claim 1, wherein the hydraulic oil circuit comprises a hydraulic oil supply to the fuel valves of a fuel gas system.

14. The lubricating oil varnish mitigation system of claim 1, wherein the hydraulic oil circuit comprises a hydraulic oil supply to an inlet guide vane system.

15. The lubricating oil vanish mitigation system of claim 1, wherein the hydraulic oil circuit comprises a hydraulic oil supply to a liquid fuel system.

16. A lubricating oil varnish mitigation system for a turbine engine, comprising:

a lubricating oil circuit;

the lubricating oil circuit comprising a lubricating oil therein, a lubricating oil tank, a plurality of pumps, and a lift oil supply;

the lubricating oil in fluid communication with components of the turbine engine; and a hydraulic oil circuit separate from the lubricating oil circuit;

the hydraulic oil circuit comprising a hydraulic oil therein, a hydraulic oil tank, and a plurality of hydraulic oil pumps;

the hydraulic oil in fluid communication with one or more servos that operate fuel valves of the turbine engine.

17. The lubricating oil varnish mitigation system of claim 16, wherein the plurality of pumps comprises a lubricating oil pump and at least one lift oil pump.

18. The lubricating oil varnish mitigation system of claim 16, wherein the hydraulic oil circuit comprises a hydraulic manifold.

19. The lubricating oil varnish mitigation system of claim 16, wherein an operating pressure of the hydraulic oil is less than an operating pressure of the lubricating oil.

20. The lubricating oil varnish mitigation system of claim 16, wherein an operating temperature of the hydraulic oil is less than an operating temperature of the lubricating oil.

* * * * *